Figure 1:
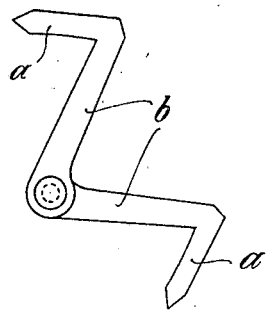

No. 878,282. PATENTED FEB. 4, 1908.
A. EISEL.
DEVICE FOR FASTENING THE HANDLES IN BRUSHES, SCRUBBERS,
AND THE LIKE.
APPLICATION FILED JUNE 21, 1907.

Wittnesses:
Geo. Heinicke
J. Franks

Inventor
August Eisel
per G. Dittman.
Attorney

UNITED STATES PATENT OFFICE.

AUGUST EISEL, OF ISERLOHN, GERMANY.

DEVICE FOR FASTENING THE HANDLES IN BRUSHES, SCRUBBERS, AND THE LIKE.

No. 878,282.

Specification of Letters Patent.

Patented Feb. 4, 1908.

Application filed June 21, 1907. Serial No. 380,112.

*To all whom it may concern:*

Be it known that I, AUGUST EISEL, a subject of the King of Prussia, German Emperor, residing at Iserlohn, in the Province of Westphalia, Kingdom of Prussia, German Empire, have invented a certain new and useful Device for Fastening the Handles in Brushes, Scrubbers, and the Like, of which the following is a specification.

This invention relates to a device for quickly and firmly fastening the handles in brushes, scrubbers and the like.

Figure 2:
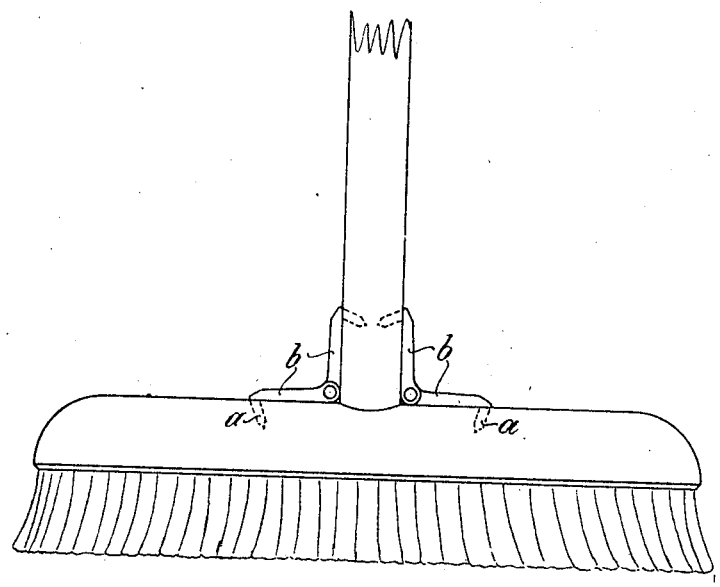

The drawing illustrates the invention as follows:

Figure 1 shows the device itself, and Fig. 2 shows its application to a brush.

The device consists of a pair of double hooks pivotally connected together as shown in Fig. 1. By means of these hooks the connection of the brush with the handle is effected as follows. After the handle has been introduced in the usual manner into a corresponding hole in the brush, or scrubber, or the like, the pair of double hooks are driven into the two parts at opposite sides, so that they take up the position illustrated in Fig. 2. The hooks $a$ inclined to the limbs $b$ as shown in the drawing, are caused to penetrate completely in the two parts of the instrument and thus prevent any loosening and coming apart thereof.

It is evident, that the hinged connection of the limbs $b$, $b$ permits of giving to the hooks $a$ a considerable length so that they hold securely in the wood of the handle and of the brush and nevertheless the removal or withdrawal is easily effected, as the hooks swing out of the hole in the wood approximately concentrically to the hinge. Thus the removal is effected without injury to the parts so that the device can be used over and over again.

Having now particularly described and ascertained the nature of my said invention and in what manner the same is to be performed, I declare that what I claim is:

A device for the fastening of the handles of brushes, scrubbers, and the like, which consists of two limbs $b$ pivotally connected with one another, each provided with a pointed hook $a$ somewhat inclined to the said limbs, adapted to be driven into the brush and the handle one point into the brush and the other into the handle.

In testimony whereof I have signed my name to this specification in the presence of two subscribing witnesses.

AUGUST EISEL.

Witnesses:
BESSIE F. DUNLAP,
LOUIS VANDORN.